(12) United States Patent
Braman et al.

(10) Patent No.: US 9,069,001 B2
(45) Date of Patent: Jun. 30, 2015

(54) SYSTEMS AND METHODS FOR POTTED SHOCK ISOLATION

(75) Inventors: Todd L. Braman, New Brighton, MN (US); Jacob Weinmann, Roseville, MN (US); Dale J. Hagenson, East Bethel, MN (US)

(73) Assignee: Honeywell International Inc., Morristown, NJ (US)

( * ) Notice: Subject to any disclaimer, the term of this patent is extended or adjusted under 35 U.S.C. 154(b) by 457 days.

(21) Appl. No.: 13/561,231

(22) Filed: Jul. 30, 2012

(65) Prior Publication Data

US 2014/0230552 A1   Aug. 21, 2014

Related U.S. Application Data

(62) Division of application No. 12/421,761, filed on Apr. 10, 2009, now Pat. No. 8,266,960.

(51) Int. Cl.
*G01P 1/02* (2006.01)
*G01C 21/16* (2006.01)

(52) U.S. Cl.
CPC .............. *G01P 1/023* (2013.01); *G01C 21/16* (2013.01)

(58) Field of Classification Search
USPC ........................................................ 73/493
See application file for complete search history.

(56) References Cited

U.S. PATENT DOCUMENTS

| 4,498,340 | A | 2/1985 | Duncan |
| 4,858,470 | A | 8/1989 | Kincaid et al. |
| 5,303,596 | A | 4/1994 | Rickman |
| 5,633,461 | A | 5/1997 | Kakizaki |
| 5,890,569 | A | 4/1999 | Goepfert |
| 6,257,057 | B1 | 7/2001 | Hulsing, II |
| 6,578,682 | B2 | 6/2003 | Braman et al. |
| 6,701,786 | B2 | 3/2004 | Hulsing, II |
| 7,157,312 | B2 | 1/2007 | Kim |
| 7,195,168 | B2 | 3/2007 | Wulff |
| 7,404,324 | B2 | 7/2008 | Braman et al. |
| 2004/0150144 | A1 | 8/2004 | Goepfert et al. |

FOREIGN PATENT DOCUMENTS

| EP | 1788277 | 5/2007 |
| WO | 9855832 | 12/1998 |
| WO | 03029756 | 4/2003 |
| WO | 2005001385 | 1/2005 |

*Primary Examiner* — Hezron E Williams
*Assistant Examiner* — Mark A Shabman
(74) *Attorney, Agent, or Firm* — Fogg & Powers LLC

(57) ABSTRACT

Systems and methods for potted shock isolation are provided. In once embodiment a shock isolation system comprises an isolator comprising an outer ring for mounting to an external housing, and an inner ring connected to the outer ring via an isolating element; and an inertial sensing assembly comprising: at least one circuit board secured to the inner ring of the isolator, the at least one circuit board further comprising a triad of gyroscopes and a triad of accelerometers; and a low durometer highly dampened supporting material encapsulating a first surface of the at least one circuit board.

10 Claims, 7 Drawing Sheets

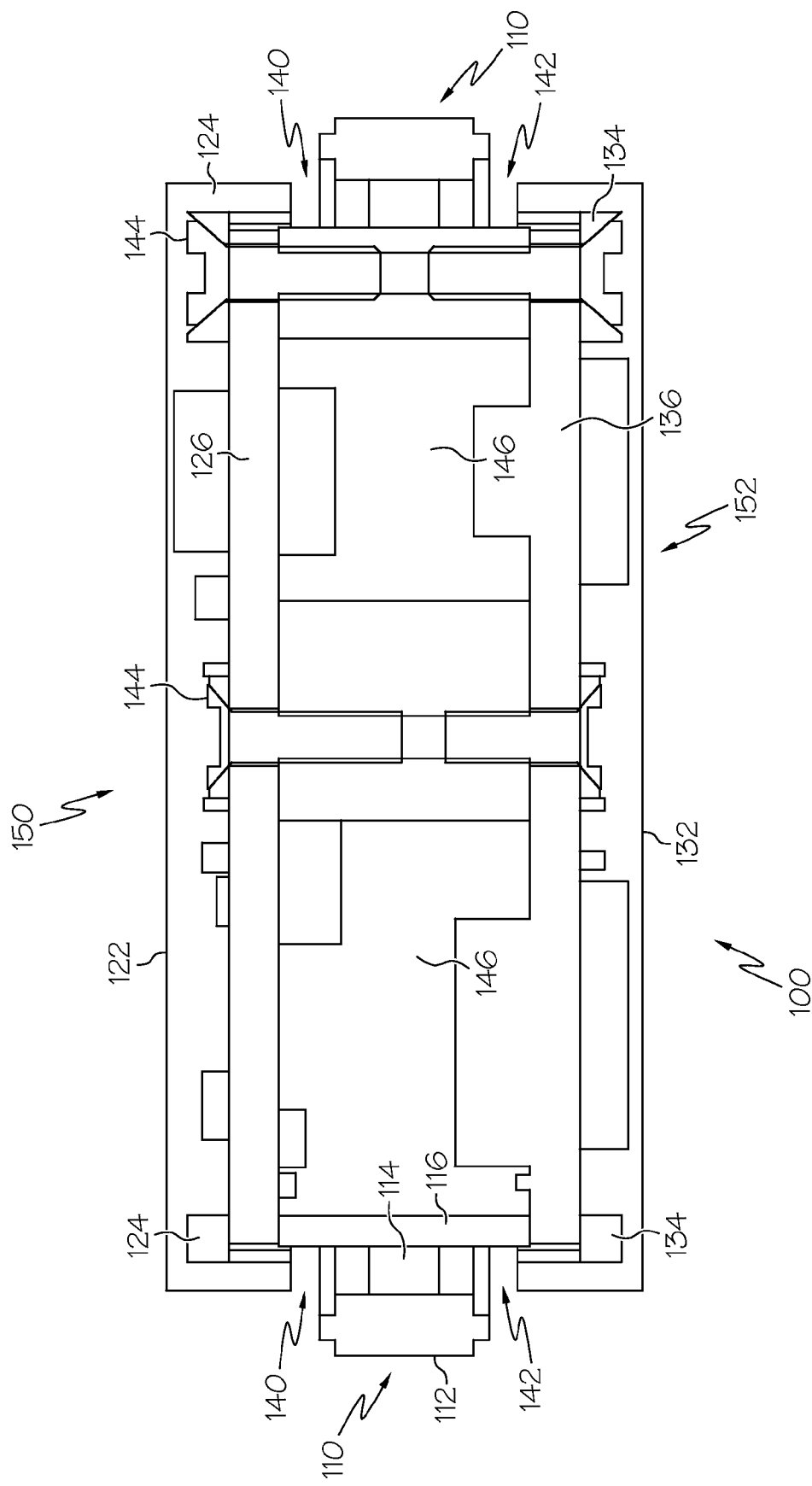

SYSTEMS AND METHODS FOR POTTED SHOCK ISOLATION

CROSS-REFERENCE TO RELATED APPLICATIONS

This application is a divisional of pending U.S. application Ser. No. 12/421,761 entitled "SYSTEMS AND METHODS FOR POTTED SHOCK ISOLATION," filed Apr. 10, 2009, which is incorporated herein by reference.

BACKGROUND

Inertial measurement units (IMUs) are used in a variety of applications such as air and space vehicles, watercraft vehicles, and guided missiles. IMUs detect the rate of acceleration and change in rotational attributes about three axes for a given time period. This data is used by a control system in order to track the application's position using a method known as dead reckoning. In one such application, Inertial Measurement Units (IMUs) are used to guide large caliber projectiles. During the launch of such a projectile, the IMU is subjected to high accelerations and thus requires ability to absorb this energy without incurring damage to the sensitive electronic components of which it is comprised. Current shock isolation systems for these applications include a rubber isolator for mounting the inertial sensing assembly (ISA), which is comprised of accelerometers and gyroscopes, within the IMU housing and a shock ring applied to the ISAs circuit board to absorb energy when it bottoms out during gun launch. Examples of such shock isolation systems are provided by U.S. Pat. No. 7,404,324, herein incorporated by reference. The problem with such current systems is that the shock ring still allows significant distortion of the ISAs circuit board due to bowing at the center of the board. Such bowing can damage the ISAs circuit board.

For the reasons stated above and for other reasons stated below which will become apparent to those skilled in the art upon reading and understanding the specification there is a need in the art for improved IMU shock isolation systems and methods.

SUMMARY

The Embodiments of the present invention provide methods and systems for an accelerated block option for TFTP file transfers and will be understood by reading and studying the following specification.

Systems and methods for potted shock isolation are provided. In once embodiment a shock isolation system comprises an isolator comprising an outer ring for mounting to an external housing, and an inner ring connected to the outer ring via an isolating element; and an inertial sensing assembly comprising: at least one circuit board secured to the inner ring of the isolator, the at least one circuit board further comprising a triad of gyroscopes and a triad of accelerometers; and a low durometer highly dampened supporting material encapsulating a first surface of the at least one circuit board.

DRAWINGS

Embodiments of the present invention can be more easily understood and further advantages and uses thereof more readily apparent, when considered in view of the description of the preferred embodiments and the following figures in which:

FIGS. 1A-1D are illustration of a shock isolation system of one embodiment of the present invention;

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention improve on the prior art by applying a low durometer highly dampened supporting material across outward facing surfaces of the ISA circuit board to encapsulate both the surface of the circuit board and shock ring within the material. Thus when the isolated ISA assembly bottoms out, the ISA circuit board is supported across its whole surface to reduce bowing of the ISA circuit board.

Figure 1A:
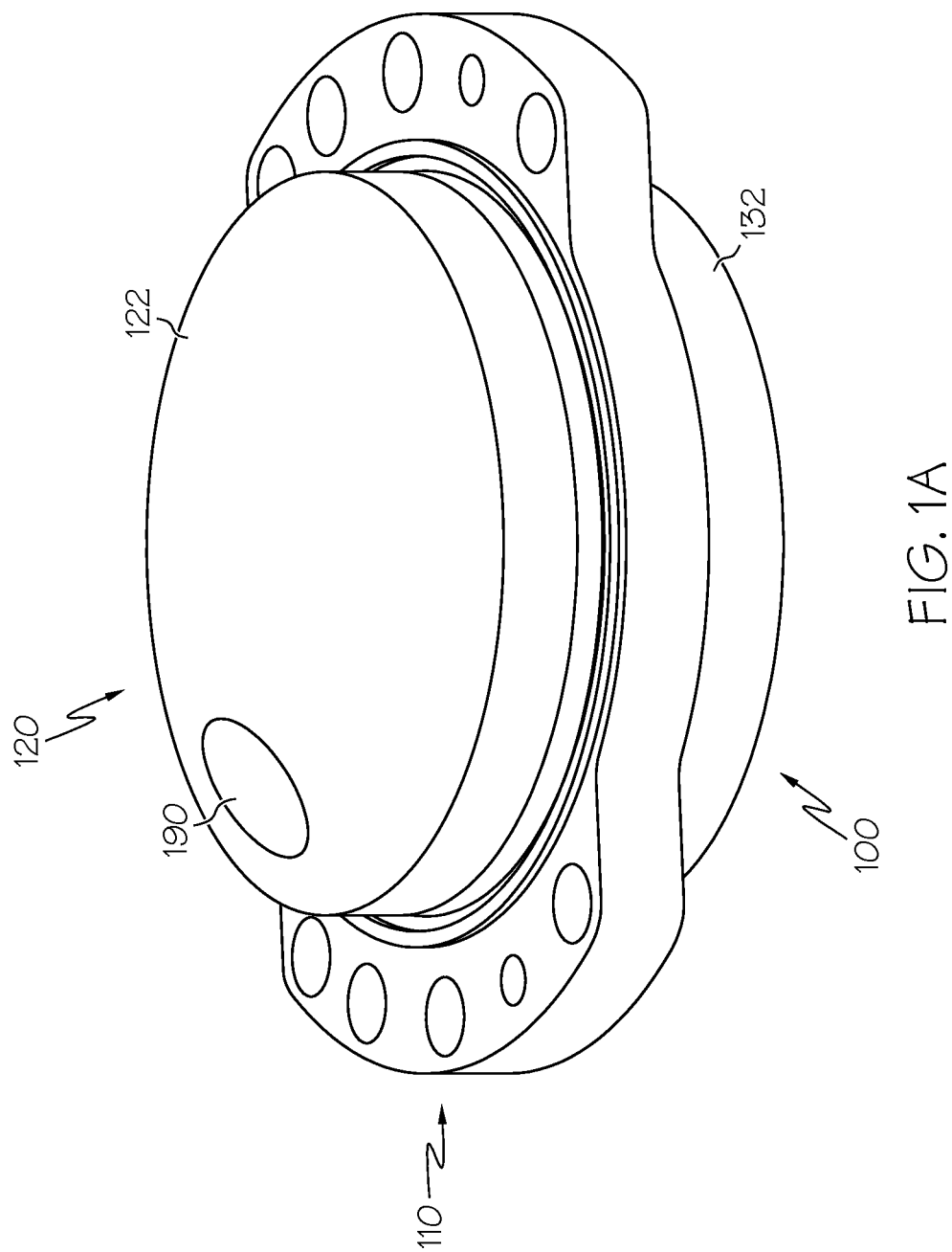
Figure 1C:
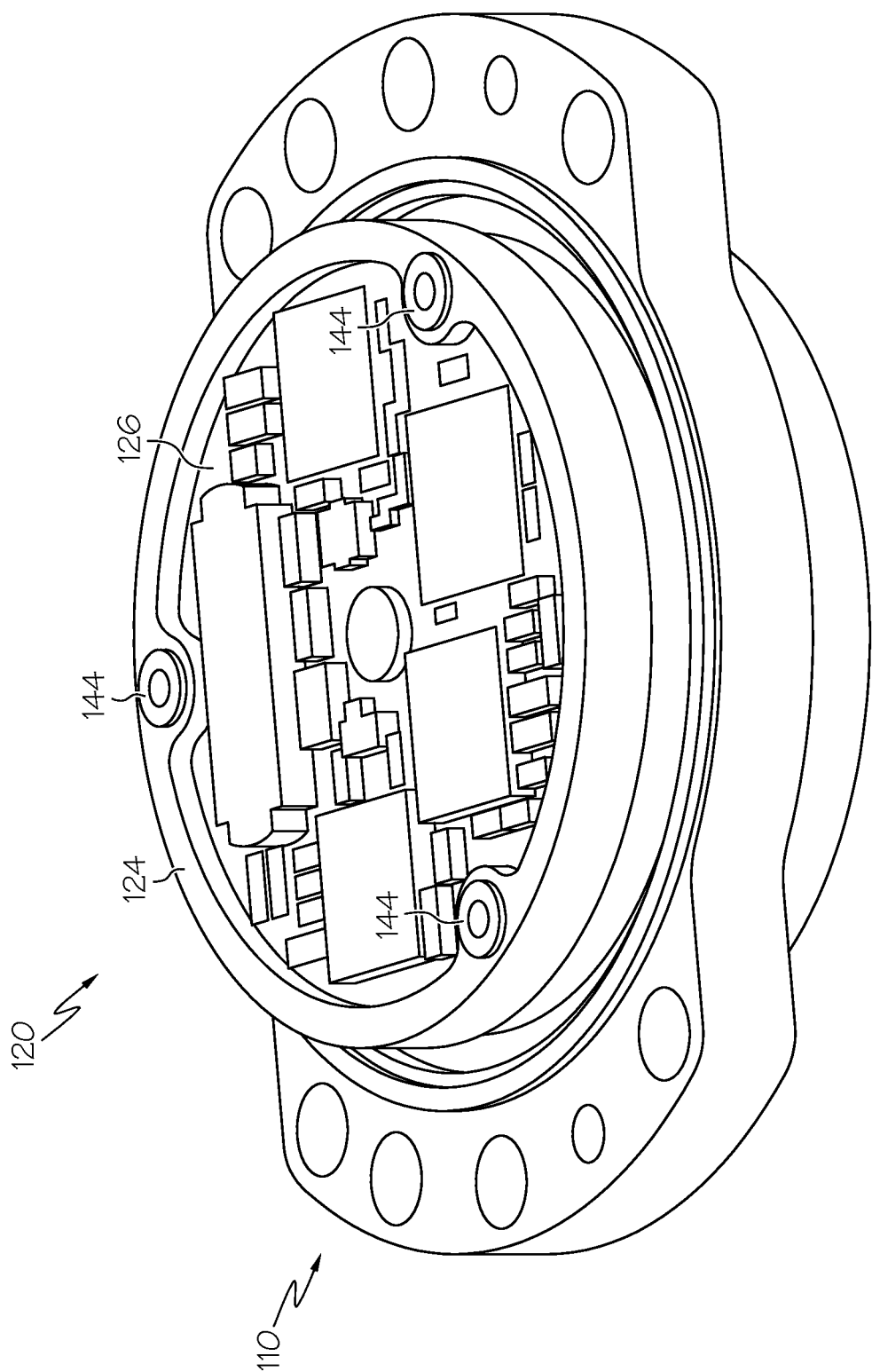
Figure 1D:
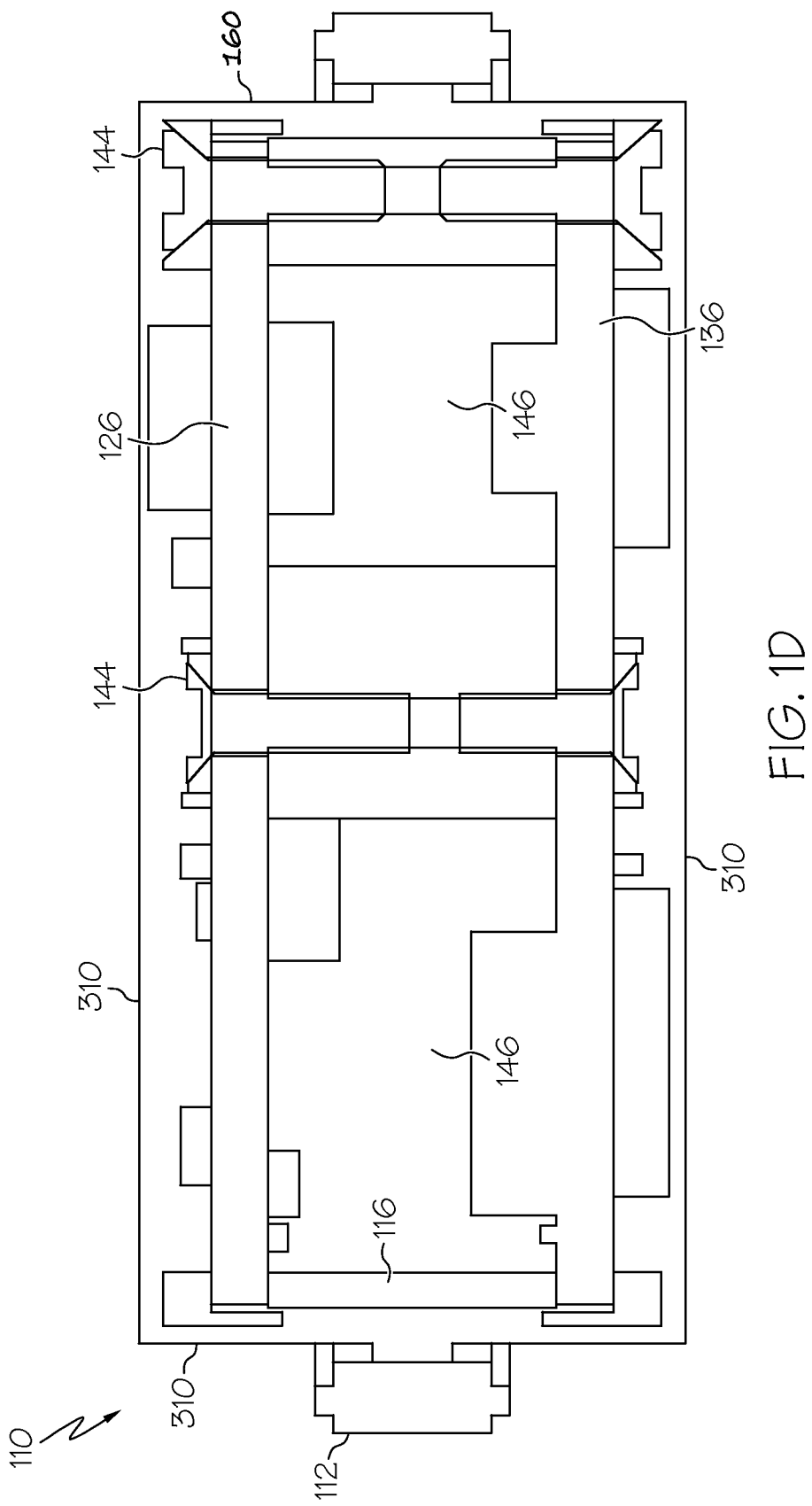

FIGS. 1A-1C illustrate a shock isolation system 100 of one embodiment of the present invention. FIG. 1A shows a shock isolation system 100 comprises an isolator 110 coupled to an isolated ISA 120 having a forward region supporting material 122 and a back region supporting material 132 molded across outward facing surfaces of the ISAs circuit boards.

FIG. 1B provides a cut-away view to illustrate shock isolation system 100 in greater detail. As shown in FIG. 1B, isolator 110 further comprises an outer ring 112 for securing shock isolation system 100 to an external housing and inner ring 116 for attaching ISA 120 which are connected via an isolating element such as isolating ring 114 (comprised of a silicon rubber, for example). ISA 120 comprises a first circuit board 126 and a second circuit board 136. In one embodiment, one circuit board comprises a triad of accelerometers while the other circuit board comprises a triad of gyroscopes. The first circuit board 126 and second circuit board 136 are respectively mounted onto inner ring 116 of isolator 110. The first circuit board 126 is mounted onto a forward region side 150 (the side facing the direction of launch) of the inner ring 116. The second circuit board 136 is mounted onto a back region side 152 (the side facing away from the direction of launch) of the inner ring 116.

In order to mitigate projectile launch shock forces, a shock ring 124 is mounted about the periphery of the first circuit board 126. A supporting material 122 covers the forward region side 150 of the ISA 120 by encapsulating the outer surface of the first circuit board 126 and extending over the outer surface of first shock ring 124 while leaving an air gap 140 around the periphery of ISA 120 between supporting material 122, isolating ring 114, and the structure within which the ISA 120 is contained (as discussed below for FIG. 2A). Similarly, a shock ring 134 is also mounted about the periphery of the second circuit board 136. A supporting material 132 covers the back region side 152 of the ISA 120 by encapsulating the outer surface of the second circuit board 136 and extending over the outer surface of second shock ring 134 while leaving an air gap 142 around the circumference of IMU 120 between supporting material 132 and isolating ring 114. For further illustration, FIG. 1C provides a view of shock isolation system 100 with supporting material 122 pulled away to reveal shock ring 124 and first circuit board 126. As mentioned above supporting materials 122 and 132 are comprised of a low durometer highly dampened material such as a silicon rubber. One of ordinary skill in the art, upon reading this specification, would be able to readily select a material for implementing supporting materials 122 and 132 based on the volume and mass of the ISA and the surface area of the circuit boards and by further considering the particular frequency response and dampening requirements of the application.

Supporting material 132, being in the set back region, will experience greater structural stresses during gun launch than the supporting material 122 in the set forward region. For this reason, in one embodiment supporting materials 132 on back region side 152 is thicker than supporting materials 122 on front region side 150. In one embodiment, one or both of supporting materials 122 and 132 further include at least one connector penetration 190. Connector penetration 190 may comprise a potted connector or similar device to provide an electrical signal and/or power interface between circuit boards 126 and 136 and at least one external device, such as a processor.

Although FIGS. 1A-1D illustrate, shock ring 124 mounted about the periphery of the first circuit board 126, and shock ring 134 mounted about the periphery of the second circuit board 136, alternate embodiments include shock isolation systems incorporating only one shock ring (mounted to one of the circuit boards) or shock isolation systems without a shock ring. In such embodiments, a circuit board without a shock ring may be mounted to the inner ring 116 of isolator 110 with fasteners or a glue (such as epoxy, for example) and the supporting material would be applied over exposed surfaces that contact the housing.

Figure 2A:
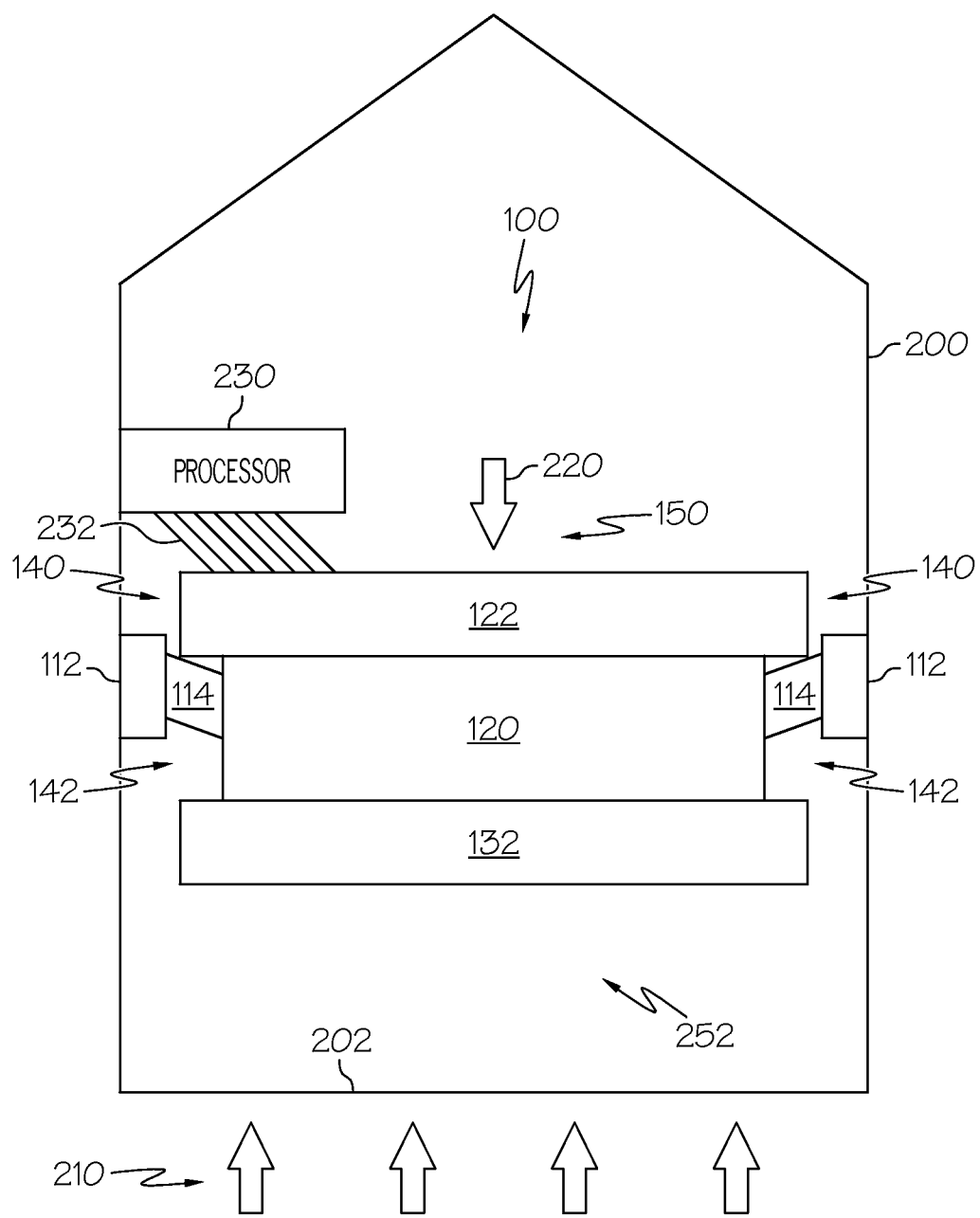
FIGS. 2A and 2B are illustration of a shock isolation system within a projectile of one embodiment of the present invention.
Figure 2B:
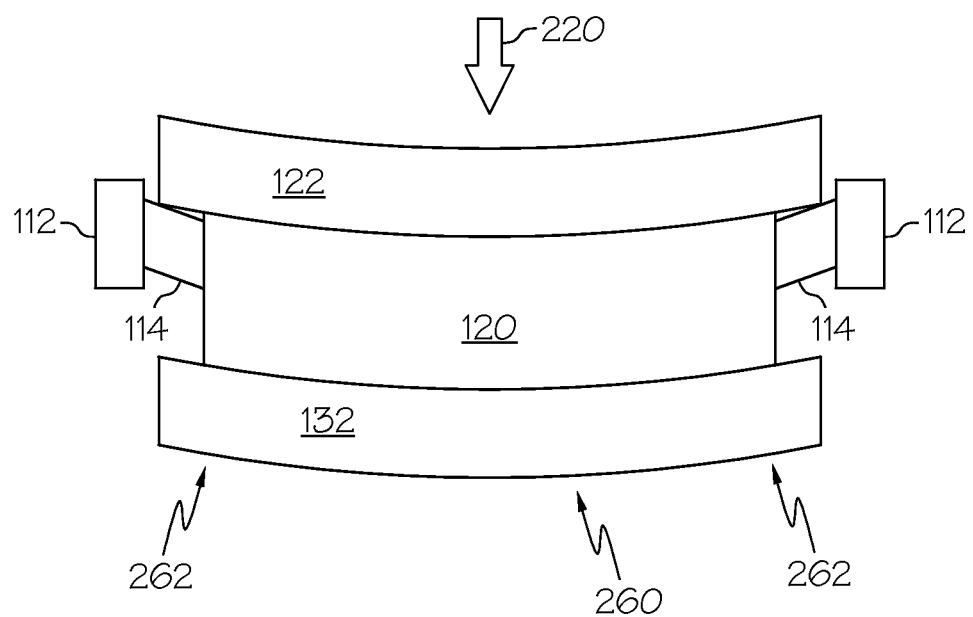

FIG. 2A is an illustration of an IMU 200 comprising a shock isolation system 100 for an ISA 120 of one embodiment of the present invention. IMU 200 further includes a processor 230 that is coupled to ISA 120 via a flexible cable 232 or similar connection. As shown, outer ring 112 of the isolator is secured within the body of IMU 200 which provides a housing for shock isolation system 100. In one embodiment, outer ring 112 of the isolator is an integral part of the body or other structural component of IMU 200. In operation during a launch, IMU 200 experiences an extreme acceleration (illustrated generally at 210) in the direction of launch. This acceleration 210 generates counter inertial forces (shown generally at 220) which act upon ISA 120, causing a relative displacement of ISA 120 with respect to the body of projectile 200 towards a setback region 252. The compliance of the isolating element 114 allows for such displacement until the bottom surface of 132 contacts the IMU 200 housing surface 202. A similar deflection can occur in the opposite direction due to the deceleration of the projectile. As ISA 120 thus bottoms out, shock rings 124 and 134 support the periphery of circuit boards 126 and 136, respectively depending on acceleration or deceleration, preventing further displacement of these portions of circuit boards 126 and 136. However, as illustrated in FIG. 2B, although shock rings 124 and 134 support the periphery of circuit boards 126 and 136, the counter inertial forces 220 continue to act on ISA 120 causing it to bow at its center (shown generally at 260). Encapsulation of the circuit boards 126 and 136 by the supporting materials 122 and 132 acts to provide additional support across the whole surface of the circuit boards to restrict this bowing to a level that will not damage the circuit board.

Referring back to FIG. 1B, in one alternate embodiment, the cavity 146 formed between the first circuit board 126, the second circuit board 136 and the inner ring 116, is also filled with a supporting material. The supporting material may be the low durometer highly dampened material used for supporting materials 122 and 132, or alternatively may be another supporting material. The exact material used can be readily determined by one of ordinary skill in the art upon reading this specification. Filling cavity 146 with the supporting material provides even further protection from bowing by supporting both sides of the circuit boards. In one embodiment, the supporting material may further comprise carbon or a similar heat conductor, to absorb thermal energy generated by the electrical components of the circuit boards and transfer that heat to the environment surrounding ISA 120. Although FIG. 1A illustrates application of supporting material 122 onto circuit board 126 resulting in a smooth surface, in alternate embodiments, the exposed surfaces of supporting materials 122 and 132 may be contoured or otherwise textured with bumps, dimples, divots, or other shapes. In yet another embodiment, illustrated by FIG. 1D, the forward region supporting material, back region supporting material and the isolating ring 114 of isolator 110 are integrated together encapsulating the whole of inner ring 116 and circuit boards 126 and 136 with a single supporting material unit 160.

Figure 3:
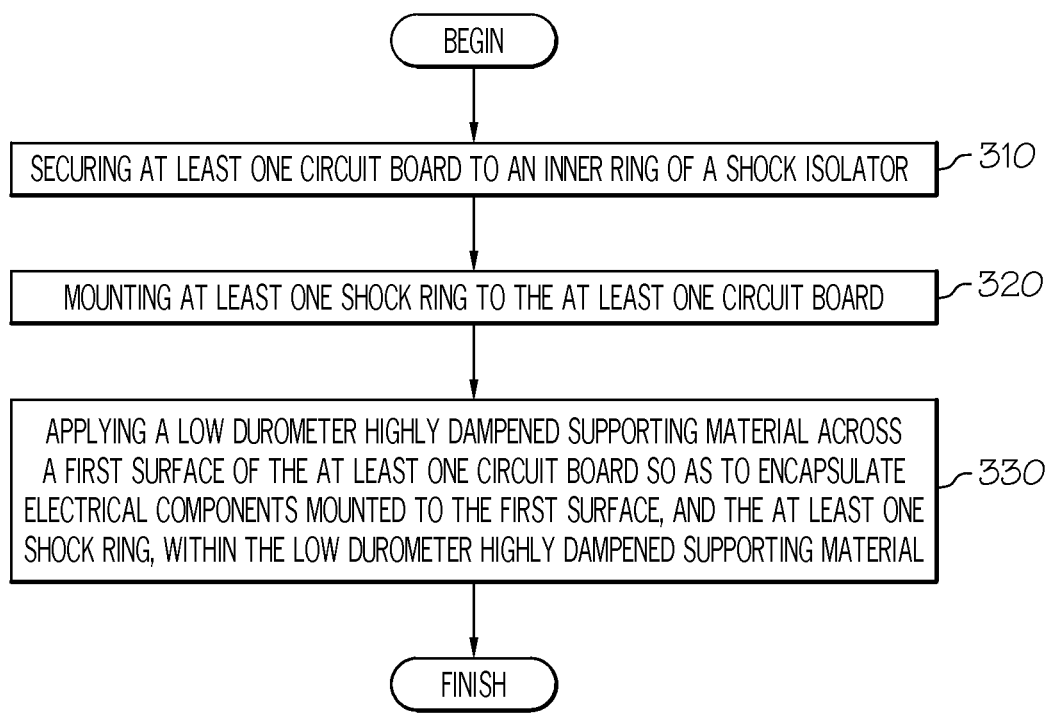
FIG. 3 is a flow chart illustrating a method of one embodiment of the present invention.

FIG. 3 is a flow chart illustrating a process for providing shock isolation for an inertial measurement unit of one embodiment of the present invention. The method begins at 310 with securing at least one circuit board to an inner ring of a shock isolator. In one embodiment, the at least one circuit board is mounted to the inner ring of the isolator with one or more fasteners. In one embodiment, a first circuit board is mounted to a forward region side of the shock isolator while a second circuit board is mounted to a back region side of the shock isolator. Circuit boards may include various electronic devices such as, but not limited to inertial sensor gyroscopes and accelerometers. In one embodiment, securing at least one circuit board to an inner ring comprises securing a triad of mutually orthogonally oriented gyroscopes and a triad of mutually orthogonally oriented accelerometers to the inner ring. The method proceeds to 320 with mounting at least one shock ring to the at least one circuit board. Mounting a shock ring to the circuit board structurally protects the circuit board from twisting motions and shock forces experienced during rapid acceleration conditions. The method proceeds to 330 with applying a low durometer highly dampened supporting material across a first surface of the at least one circuit board so as to encapsulate electrical components mounted to the first surface, and the at least one shock ring, within the low durometer highly dampened supporting material. The method may further comprise filling at least one cavity located within the inner ring of the shock isolator with the low durometer highly dampened supporting material.

In one embodiment, the low durometer highly dampened supporting material is a silicon rubber material. In one embodiment applying a low durometer highly dampened supporting material further comprises encapsulating the inner ring of the isolator within the low durometer highly dampened supporting material to form a single supporting material unit. In one alternate embodiment, the method further comprises providing at least one connector penetration within the low durometer highly dampened supporting material to provide for an electrical signal and/or power interface between the at least one circuit board and an external device, such as a processor.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for providing a shock isolation for an inertial measurement unit, the method comprising:
    securing at least one circuit board to an inner ring of a shock isolator, the at least one circuit board and shock isolator defining an inertial sensor assembly; and
    applying a low durometer highly dampened supporting material across a first surface of the at least one circuit board so as to encapsulate electrical components mounted to the first surface within the low durometer highly dampened supporting material; wherein the low durometer highly dampened supporting material forms an external enclosure of the inertial sensor assembly, the low durometer highly dampened supporting material of the external enclosure further encapsulating and potting one or more electrical components mounted to the first surface within the low durometer highly dampened supporting material.

2. The method of claim 1, further comprising:
    mounting at least one shock ring around a periphery of the at least one circuit board, wherein the low durometer highly dampened supporting material further encapsulates the at least one shock ring.

3. The method of claim 1, further comprising:
    mounting a first circuit board to a forward region side of the shock isolator; and
    mounting a second circuit board to a back region side of the shock isolator.

4. The method of claim 1, wherein securing at least one circuit board to an inner ring of a shock isolator further comprises:
    securing a triad of mutually orthogonally oriented gyroscopes and a triad of mutually orthogonally oriented accelerometers to the inner ring.

5. The method of claim 1, further comprising:
    filling at least one cavity located within the inner ring of the shock isolator with a second supporting material.

6. The method of claim 1, wherein the low durometer highly dampened supporting material comprises a silicon rubber.

7. The method of claim 1, wherein the low durometer highly dampened supporting material comprises a carbon material.

8. The method of claim 1, wherein applying the low durometer highly dampened supporting material further comprises encapsulating the inner ring of the isolator, at least one shock ring, and the at least one circuit board within a supporting material unit.

9. The method of claim 1, further comprising:
    providing at least one connector penetration within the low durometer highly dampened supporting material.

10. The method of claim 1, wherein an exposed surface of the low durometer highly dampened supporting material is contoured.

* * * * *